United States Patent
Kim et al.

(10) Patent No.: US 9,911,517 B2
(45) Date of Patent: Mar. 6, 2018

(54) CARBON FELT IMPREGNATED WITH INORGANIC PARTICLES AND METHOD FOR PRODUCING THE SAME

(71) Applicant: KOREA INSTITUTE OF SCIENCE AND TECHNOLOGY, Seoul (KR)

(72) Inventors: Chang-Sam Kim, Seoul (KR); Sang Whan Park, Seoul (KR); Byung Won Cho, Seoul (KR); Kyoung Ran Lim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 423 days.

(21) Appl. No.: 14/476,907

(22) Filed: Sep. 4, 2014

(65) Prior Publication Data
US 2015/0255796 A1    Sep. 10, 2015

(30) Foreign Application Priority Data

Mar. 7, 2014    (KR) .......................... 10-2014-0026869

(51) Int. Cl.
*H01B 1/04*    (2006.01)
*B01J 13/00*    (2006.01)
(Continued)

(52) U.S. Cl.
CPC ............ *H01B 1/04* (2013.01); *B01J 13/0034* (2013.01); *B01J 13/0039* (2013.01);
(Continued)

(58) Field of Classification Search
CPC ... H01B 1/00; H01B 1/04; H01B 1/06; H01B 1/08; H01B 1/14; H01B 1/18; H01M 4/64;
(Continued)

(56) References Cited

U.S. PATENT DOCUMENTS 3,689,300 A * 9/1972 Bunger .................. B82Y 30/00
                                                   106/287.1
4,084,041 A    4/1978 Ludwig
(Continued)

FOREIGN PATENT DOCUMENTS

EP    1296392 B1    3/2003
GB    1528672 A    10/1978
(Continued)

OTHER PUBLICATIONS

English machine translation of JP 2011054839 A (2011).*
(Continued)

*Primary Examiner* — Harold Pyon
*Assistant Examiner* — Matthew R Diaz
(74) *Attorney, Agent, or Firm* — Ladas & Parry LLP (57) ABSTRACT

Disclosed is a carbon felt impregnated with inorganic particles. The impregnated carbon felt can be used together with sulfur in a cathode of a sodium-sulfur (Na—S) battery. Also disclosed is a method for producing the impregnated carbon felt. According to exemplary embodiments, the problem of the prior art can be solved in which inorganic particles such as alumina particles are not directly adhered to carbon felts, thus necessitating complicated processes. In addition, a slurry including an inorganic binder and alumina particles can be used to directly coat the alumina particles on the surface of a carbon felt, making the production procedure very simple. Furthermore, the use of the carbon felt surface coated with the alumina particles in a Na—S battery increases the wicking of sodium polysulfides, suppresses the accumulation of sulfur as an insulator on the surface of beta-alumina as an electrolyte, and inhibits non-uniform aggregation of sulfur or sodium polysulfides on the carbon felt, so that the concentration polarization of charges can be reduced without a significant increase in the internal resis-
(Continued)

tance of the battery, achieving high utilization efficiency of sulfur as a reactant.

8 Claims, 6 Drawing Sheets

(51) Int. Cl.
*H01M 4/66* (2006.01)
*H01M 4/96* (2006.01)
*H01M 4/04* (2006.01)
*H01M 4/80* (2006.01)
*H01M 10/39* (2006.01)
*H01M 4/1397* (2010.01)

(52) U.S. Cl.
CPC ....... *B01J 13/0047* (2013.01); *H01M 4/0416* (2013.01); *H01M 4/663* (2013.01); *H01M 4/664* (2013.01); *H01M 4/96* (2013.01); *H01M 4/1397* (2013.01); *H01M 4/667* (2013.01); *H01M 4/806* (2013.01); *H01M 10/3909* (2013.01); *H01M 10/3954* (2013.01)

(58) Field of Classification Search
CPC ........ H01M 4/66; H01M 4/663; H01M 4/664; H01M 4/665; H01M 4/666; H01M 4/96; H01M 10/39; H01M 10/3909; H01M 10/3954; H01M 10/3972; H01M 4/0416; C01B 31/089; C01B 31/12; C01B 31/125; B01F 13/00; B01F 13/0004; B01F 13/0008; B01F 13/0013; B01F 3113/0017; B01F 13/0021; B01F 13/0026; B01F 13/0039; B01F 13/0043; B01F 13/0047; B01F 13/0052; B01F 13/0056; B01F 13/006; B01F 13/0065; B01F 13/0069; B01F 13/0073; B01F 13/0078; B01F 13/0082; B01F 13/0086

See application file for complete search history.

(56) References Cited

U.S. PATENT DOCUMENTS

| | | | |
|---|---|---|---|
| 4,118,545 A | 10/1978 | Jones et al. | |
| 4,460,640 A * | 7/1984 | Chi | C03C 14/002 156/155 |
| 4,522,801 A * | 6/1985 | Yoshinari | D01F 9/22 264/29.2 |
| 4,801,399 A * | 1/1989 | Clark | C04B 35/80 501/12 |
| 4,944,991 A | 7/1990 | Karas et al. | |
| 5,591,380 A * | 1/1997 | Wright | B01J 13/00 501/12 |
| 5,798,307 A * | 8/1998 | Davidovits | C04B 12/005 423/328.1 |
| 5,849,110 A * | 12/1998 | Blohowiak | C09D 4/00 148/247 |
| 7,192,986 B2 * | 3/2007 | Koyanagi | B82Y 30/00 106/287.11 |
| 7,569,614 B2 * | 8/2009 | Ema | B01J 13/0008 516/922 |
| 2009/0078514 A1* | 3/2009 | Baud | C04B 35/624 188/218 XL |
| 2012/0077664 A1* | 3/2012 | Jangbarwala | B01J 21/18 502/1 |

FOREIGN PATENT DOCUMENTS

| | | | |
|---|---|---|---|
| JP | 03150241 A | * | 6/1991 |
| JP | 2006077343 A | * | 3/2006 |
| JP | 2011054839 A | * | 3/2011 |
| KR | 20120075068 A | | 7/2012 |

OTHER PUBLICATIONS

English machine translation of Honma et al., JP 2006-077343 A (2006).*
English machine translation of Nakao et al., JP 03150241 A (1991).*

* cited by examiner

FIG. 2A
(Representative Figure)

FIG. 2B
(Representative Figure)

CARBON FELT IMPREGNATED WITH INORGANIC PARTICLES AND METHOD FOR PRODUCING THE SAME

CROSS-REFERENCE TO RELATED APPLICATIONS

This application claims priority under 35 U.S.C. § 119 to Korean Patent Application No. 10-2014-0026869 filed on Mar. 7, 2014 in the Korean Intellectual Property Office, the invention of which is incorporated herein by reference in its entirety.

BACKGROUND OF THE INVENTION

1. Field of the Invention

The present invention relates to a carbon felt impregnated with inorganic particles and a method for producing the same. More specifically, the present invention relates to a carbon felt that can be used together with sulfur in a cathode of a sodium-sulfur (Na—S) battery, and a method for producing the impregnated carbon felt.

2. Description of the Related Art

A general sodium-sulfur (Na—S) battery is a sealed secondary battery for large capacity power storage that is operated at a high temperature of 300 to 350° C. The Na—S battery has the advantages of being free from self-discharge and high charge-discharge efficiency. The Na—S battery includes a Na anode, a sulfur cathode, and a solid electrolyte (beta alumina) separating the two electrodes. Only $Na^+$ ions selectively pass through the electrolyte. Since sulfur is an insulator, the sulfur (S) electrode uses a felt impregnated with sulfur. The felt is composed of carbon fibers through which electrons created as a result of a chemical reaction between sulfur and sodium can move.

The carbon felt is a mat composed of carbon fibers whose diameter is from several microns to a dozen of microns. The carbon felt has a porosity of about 90%. The sulfur electrode is produced by impregnating the carbon felt with sulfur. In the sulfur electrode, $Na^+$ ions are non-uniformly distributed, which causes many problems.

Particularly, since slow migration of sodium polysulfides causes different degrees of polarization, sulfur failing to participate in the reaction at a proper time or sodium polysulfides are isolated and aggregated, causing the problem that the amount of recirculating electric current may vary. In order to solve this problem, the migration velocity of $Na^+$ ions needs to be increased. Many methods have been proposed to increase the migration velocity of $Na^+$ ions. For example, forced convection of Na ions was proposed but is impractical. High operating temperatures of batteries undesirably accelerates the corrosion of the batteries. A reduction in the viscosity of sulfur has never been reported before. Increased mobility of $Na^+$ ions leads to an improvement in the performance of Na—S batteries. Thus, research is currently being conducted to increase the mobility of $Na^+$ ions.

Carbon surface tends to be wet with sulfur but is not easily wet with sodium polysulfides. In contrast, alumina surface tends to be wet with sodium polysulfides but has poor wettability with sulfur. Accordingly, the use of a carbon felt attached with alumina will increase the wicking of sodium polysulfides, thus promoting the migration of sodium ions in a sulfur electrode. In addition, the formation of an insulating sulfur layer at the interface between beta-alumina and a sulfur electrode during recharge considerably increases the internal resistance of the battery to stop the recharging before sodium polysulfides are completely converted to sulfur. This limits the use of sulfur as a reactant. Under such circumstances, attempts to impregnate alumina particles into carbon felts have been disclosed.

As an approach to solve the above problems, U.S. Pat. No. 4,084,041 discloses the use of an alumina-treated carbon felt around a beta-alumina tube. According to this approach, sodium polysulfides do not remain unchanged and are oxidized to sulfur when recharged, achieving high utilization efficiency of sulfur as a reactant. GB 1528672 discloses the use of a carbon felt produced by mixing carbon fibers with alumina fibers.

Further, U.S. Pat. No. 4,944,991 discloses the dispersion of alumina in the form of small nodules throughout a carbon felt by impregnating an aqueous solution of an acidic aluminum compound such as aluminum sulfate into the carbon felt. EP 1296392 discloses a method for increasing the charge-discharge efficiency of a battery and reducing the internal resistance of the battery by needle-punching glass fibers into a carbon felt. KR 2012-0075068 discloses a method for improving the performance of a sodium-sulfur battery by partially coating alumina on the outer wall of beta-alumina tube highly wettable with sodium polysulfides in the form of fine semi-spheres. According to this method, the alumina is coated by spraying to maintain a constant reaction area of sodium and sulfur during charge-discharge. In addition, sodium polysulfides are prevented from being attached to the outer wall of beta-alumina and are easily separated from the outer wall of beta-alumina once it has been attached thereto.

However, the conventional methods are succeeded in increasing the utilization efficiency of sulfur as a reactant during long-term cycles but suffer from the problem of increasing the internal resistance of the battery. Other problems of the conventional methods are that the introduction of alumina into carbon felts is complicated, small alumina powder aggregates are simply formed in carbon felts having a porosity of 90% or more, and alumina is not easily coated on the surface of carbon fibers.

SUMMARY OF THE INVENTION

The present invention has been made in an effort to solve the problems of conventional Na—S batteries in which sulfur or sodium polysulfides do not migrate rapidly enough and form isolated pockets, and it is intended to provide a method for producing a carbon felt for an electrode whose surface is coated with highly wettable alumina particles to increase the mobility of sodium polysulfides.

According to one exemplary aspect of the present invention, there is provided a carbon felt impregnated with inorganic particles that is produced by coating with a slurry including an inorganic sol binder and the inorganic particles. According to a further exemplary aspect of the present invention, there is provided a method for producing the impregnated carbon felt.

According to exemplary embodiments of the present invention, the problem of the prior art can be solved in which inorganic particles such as alumina particles are not directly adhered to carbon felts, thus necessitating complicated processes. In addition, a slurry including an inorganic binder and alumina particles can be used to directly and partially coat the alumina particles on the surface of a carbon felt, making the production procedure very simple. Furthermore, the use of the carbon felt surface coated with the alumina particles in a Na—S battery increases the wicking of sodium polysulfides, suppresses the accumulation of sulfur as an insulator on the surface of beta-alumina as an electrolyte, and inhibits non-uniform aggregation of sulfur or sodium polysulfides on the carbon felt, so that the concentration polarization of charges can be reduced without a significant increase in the internal resistance of the battery, achieving high utilization efficiency of sulfur as a reactant.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Aspects and embodiments of the present invention will now be described in more detail.

One aspect of the present invention discloses a carbon felt impregnated with inorganic particles that is produced using a slurry including an inorganic sol binder and the inorganic particles.

According to one embodiment of the present invention, the inorganic particles are partially coated on the carbon felt and aggregate to form small clusters at points where carbon fibers constituting the carbon felt meet together. When applied to a Na—S battery, the coated carbon felt increases the wicking of sodium polysulfides, suppresses the accumulation of sulfur as an insulator on the surface of beta alumina as an electrolyte, and inhibits non-uniform aggregation of sulfur or sodium polysulfides on the carbon felt, so that the concentration polarization of charges can be reduced without a significant increase in the internal resistance of the battery, achieving high utilization efficiency of sulfur as a reactant.

In one embodiment of the present invention, the inorganic sol binder is a peptized alumina precursor sol binder or a peptized alumina precursor-alkylsilane composite sol binder.

The "peptized alumina precursor" as used herein refers to a product obtained by peptization of an alumina precursor, mainly an acid-peptized product of an alumina precursor. For example, when a boehmite powder is dispersed in a dispersion medium and peptized under acidic conditions, the dispersion is converted into a sol as the peptization of the alumina precursor proceeds, which is described specifically in the Examples section that follows.

According to one embodiment of the present invention, the slurry of the peptized alumina precursor sol binder or the peptized alumina precursor-alkylsilane composite sol binder and the inorganic particles can be used to impregnate the inorganic particles into the carbon felt while partially coating the surface of the carbon felt with the inorganic particles.

In a further embodiment of the present invention, the alumina precursor is selected from boehmite, aluminum ethoxide, aluminum n-propoxide, aluminum isopropoxide ($Al(OiPr)_3$), aluminum n-butoxide, aluminum isobutoxide ($Al(OiBu)_3$), bayerite, diaspore, gibbsite, and mixtures thereof.

In another embodiment of the present invention, the alkylsilane is selected from 3-glycidoxypropyltrimethoxysilane, epoxyalkylsilanes, aminoalkylsilanes, alkylsilanes, and mixtures thereof.

In a further embodiment of the present invention, the inorganic particles are selected from particles of alumina, silica, $TiO_2$, $ZrO_2$, and mixtures thereof.

Preferably, the inorganic particles are alumina particles. The use of alumina particles as the inorganic particles can achieve good chemical stability and is economically advantageous.

In another embodiment of the present invention, the inorganic particles have a diameter corresponding to 1 to 10% of the thickness of the carbon fibers constituting the carbon felt.

According to one embodiment of the present invention, the preferred size of alumina particles varies depending on the thickness of carbon fibers constituting the carbon felt.

Specifically, when the carbon fibers have a thickness of about 10 µm, the use of alumina particles having a diameter of 0.1 to 1 µm is preferred because more uniform and effective coating can be achieved.

In a further embodiment of the present invention, the carbon felt has a thickness of 5 to 20 µm and a porosity of 80 to 95%.

In another embodiment of the present invention, the content of the inorganic sol binder in the slurry is from 0.5 to 5% by weight and the content of the inorganic particles in the slurry is from 3 to 30% by weight.

According to one embodiment of the present invention, the content of the inorganic sol binder in the slurry is preferably from 0.5 to 5% by weight. The presence of the inorganic sol binder in an amount of less than 0.5% by weight may cause the problem of poor adhesive strength. Meanwhile, the presence of the inorganic sol binder in an amount exceeding 5% by weight may lead to the formation of an excessively thick binder layer, which is apt to crack and be peeled off.

The content of a powder of the inorganic particles in the slurry is preferably from 3 to 30% by weight. If the content of the powder of the inorganic particles is less than 3% by weight, the amount of the inorganic particles is insufficient to coat the felt, and as a result, uniform coating of the felt is not ensured. Meanwhile, if the content of the powder of the inorganic particles exceeds 30% by weight, too large an amount of the powder tends to aggregate, failing to achieve uniform coating and impregnation.

A further aspect of the present invention discloses a method for producing a carbon felt impregnated with inorganic particles, the method including (1) preparing an inorganic sol binder, (2) dispersing the inorganic sol binder in a solvent and adding inorganic particles to the dispersion to prepare a slurry for impregnation, and (3) impregnating a carbon felt into the slurry.

In one embodiment of the present invention, the inorganic sol binder is prepared by peptizing an alumina precursor or mixing a peptized alumina precursor with an alkylsilane.

The alumina precursor may be peptized with an acid selected from nitric acid, sulfuric acid, hydrochloric acid, acetic acid, phosphoric acid, formic acid, and other organic acids.

The inorganic binder is water soluble and the dispersion is an aqueous dispersion including the inorganic binder in water. In a further embodiment of the present invention, the alumina precursor is selected from boehmite, aluminum ethoxide, aluminum n-propoxide, aluminum isopropoxide ($Al(OiPr)_3$), aluminum n-butoxide, aluminum isobutoxide ($Al(OiBu)_3$), bayerite, diaspore, gibbsite, and mixtures thereof. The alkylsilane is selected from 3-glycidoxypropyltrimethoxysilane, epoxyalkylsilanes, aminoalkylsilanes, alkylsilanes, and mixtures thereof.

The inorganic sol binder prepared in step (1) may further include one or more additives selected from: adhesion promoters, such as boric acid, phosphoric acid, polyvinyl alcohol (PVA) and acrylic resins; dispersants; and binders.

In step (2), the inorganic sol binder is mixed with powder of inorganic oxides to prepare a slurry for impregnation. The inorganic sol binder may be used to coat carbon fibers and may remain unremoved even after heat-treatment at high temperature.

The method of the present invention may further include (2') diluting the slurry with an alcohol after step (2).

In a further embodiment of the present invention, the alcohol used in step (2') may be selected from methanol, ethanol, propanol, butanol, cellosolves, and mixtures thereof.

The dilution of the slurry with the alcohol can improve the wettability of the carbon felt in the subsequent impregnation, and enhance drying of the carbon felt after impregnation.

In a further embodiment of the present invention, the inorganic particles used in step (2) have an average diameter of 0.1 to 1 μm.

According to one embodiment of the present invention, the inorganic particles may be added in the form of a powder or dispersed slurry.

In another embodiment of the present invention, the slurry prepared in step (2) contains 0.5 to 5% by weight of the inorganic sol binder and 3 to 30% by weight of the inorganic particles.

In a further embodiment of the present invention, the inorganic particles used in step (2) are selected from particles of alumina, silica, $TiO_2$, $ZrO_2$, and mixtures thereof.

Before impregnation, the carbon felt may be dipped in and taken out of an alcohol or modified water. Subsequent removal of the excess solvent or drying modifies the surface of the carbon felt. This surface modification greatly improves the wettability of the carbon felt with the slurry to ensure uniform impregnation of the carbon felt.

In another embodiment of the present invention, the method may further include (3') heat-treatment the impregnated carbon fibers after step (3) wherein the heat-treatment is performed at a temperature of 100 to 300° C. in air or at a temperature of 300 to 1200° C. in an inert gas, reducing atmosphere or vacuum.

The heat-treatment is required to remove volatile components, solvents such as water, and organic thermal decomposition products from the binder. The carbon fibers surface coated with the alumina particles may be heated at a temperature of 100 to 300° C. in air. Out of this range, there is a risk that the carbon may be oxidized. To protect the carbon fibers from oxidation, the heat-treatment may be performed at a temperature of 300 to 1200° C. in an inert gas, reducing atmosphere or vacuum. If the heat-treatment temperature is lower than 300° C., the thermal decomposition of organic materials may be insufficient. Meanwhile, if the heat-treatment temperature is higher than 1200° C., the alumina binder may undergo a phase change to α-alumina, losing its adhesiveness.

In a further embodiment of the present invention, the carbon felt is impregnated with 10 to 90% by weight of the inorganic particles.

The carbon felt may include a graphite felt.

According to one embodiment of the present invention, the carbon fibers constituting the carbon felt act as conductors through which a current of electricity can flow. Preferably, the carbon felt has a porosity of about 90%. The carbon fibers constituting the carbon felt have a thickness of about 10 μm. The carbon felt is heat-treated at a temperature of 1000° C. or more and maintained for several hours under vacuum before use. This pretreatment allows the carbon felt to have a clean surface, making the carbon felt suitable for the slurry impregnation.

The present invention will be explained in more detail with reference to the following examples. However, these examples are not to be construed as limiting or restricting the scope and disclosure of the invention. It is to be understood that based on the teachings of the present invention including the following examples, those skilled in the art can readily practice other embodiments of the present invention whose specific experimental data are not available.

Preparation Example 1: Preparation of Alumina Sol Binder-1

A powder of boehmite as an alumina precursor was dispersed in water, and then acetic acid was added thereto. The alumina precursor was peptized to prepare 10 wt % of a translucent aqueous sol.

Preparation Example 2: Preparation of Alumina Sol Binder-2

A powder of boehmite as an alumina precursor was dispersed in water, and then nitric acid was added thereto. The alumina precursor was peptized to prepare 10 wt % of a translucent aqueous sol.

Preparation Example 3: Preparation of Alumina-Silica Composite Sol-1

29 g of the alumina sol prepared in Preparation Example 1 was mixed with 10 g of 3-glycidoxypropyltrimethoxysilane (GPTMS) to prepare a translucent alumina-silica composite sol.

Preparation Example 4: Preparation of Alumina-Silica Composite Sol-2

29 g of the alumina sol prepared in Preparation Example 2 was mixed with 10 g of GPTMS to prepare a translucent alumina-silica composite sol.

Example 1: Production of Carbon Felt Using Alumina Powder/Alumina Sol Binder-1

9.3 g of a slurry of 80 wt % alumina (average particle size=0.3 μm) dispersed in distilled water was added to 20 g of the alumina sol binder prepared in Preparation Example 1. To the mixture was added methanol with stirring to prepare 75 g of a slurry for impregnation.

A carbon felt specimen (about 120 mm×30 mm×10 mm) was heated under vacuum at 1200° C. for 2 hr. After a result of the heat-treatment, the surface of the carbon felt specimen was made clear. The heat treated carbon felt specimen (4.68 g) was dipped in the slurry, and then the excess slurry was removed from the carbon felt. The impregnated carbon felt was dried at 60° C. and further dried at 120° C. until a weight change was not observed any more.

The weight of the carbon felt was increased by 70% after impregnation.

The impregnated carbon felt was annealed at 1050° C. for 2 hr under a flow of 10% $H_2$/Ar. The carbon felt was found to undergo a weight loss of 2 wt %.

Example 2: Production of Carbon Felt Using Alumina Powder/Alumina Sol Binder-2

6.46 g of a slurry of 80 wt % alumina (average particle size=0.3 μm) dispersed in distilled water was added to 6.28 g of the alumina sol binder prepared in Preparation Example 1. To the mixture was added methanol with stirring to prepare 70 g of a slurry for impregnation.

About 4.67 g of a carbon felt specimen (about 120 mm×30 mm×10 mm) was dipped in the slurry, and then the excess slurry was removed from the carbon felt. The impregnated carbon felt was dried at 60° C. and further dried at 120° C. until a weight change was not observed any more.

The weight of the carbon felt was increased by 31% after impregnation.

Example 3: Production of Carbon Felt Using Alumina Powder/Alumina-Silica Composite Sol Binder-1

2.3 g of a slurry of 75 wt % dispersed alumina (average particle size=0.3 μm) was added to 3.9 g of the alumina-silica composite sol prepared in Preparation Example 3. To the mixture was added 91.8 g of distilled water to prepare a slurry having a concentration necessary for impregnation.

The slurry was not uniformly impregnated into a carbon felt due to its poor wettability in the carbon felt. In order to improve the wettability of the carbon felt with the slurry, the surface of the carbon felt was modified by the following procedure. First, 4.23 g of a carbon felt specimen (about 120 mm×27 mm×10 mm) was dipped in and taken out of a 0.02 wt % dilute solution of a polyethylene glycol-based surface modifier (FS20, BASF) in methanol. After removal of the excess methanol, the carbon felt specimen was dipped in the slurry. The excess slurry was removed from the surface of the carbon felt. The dipping procedure was conducted once more to further coat the carbon felt with the slurry.

Then, the impregnated carbon felt was dried at 60° C. and further dried at 120° C. until a weight change was not observed any more.

The weight of the carbon felt was increased by 27% after impregnation.

Comparative Example 1: Production of Carbon Felt Using Alumina Sol Binder Only

Methanol was added to 3.03 g of the alumina sol binder prepared in Preparation Example 2 to prepare 33.3 g of a dilute alumina sol.

A 4.40 g of a carbon felt specimen (about 120 mm×28 mm×10 mm) was dipped in the dilute alumina sol binder, and then the excess solution was removed from the surface of the carbon felt. The impregnated carbon felt was dried at 60° C. and further dried at 120° C. until a weight change was not observed any more.

The weight of the carbon felt was increased by 6.4% after impregnation.

Comparative Example 2: Production of Carbon Felt Using Alumina-Silica Composite Sol Binder Only A carbon felt impregnated with an alumina-silica composite sol was produced in the same manner as in Example 3, except that the alumina slurry was not added.

The weight of the carbon felt was increased by 10% after impregnation.

As a result of comparing the weight gains of the carbon felts of Examples 1-3 and Comparative Examples 1-2, it was confirmed that the weights of the carbon felts impregnated with the alumina powder/alumina sol binder or the alumina powder/alumina-silica composite sol binder (Examples 1-3) were increased by at least about 2.7 times to as many as about 11 times compared to those of the carbon felt impregnated with the alumina sol binder only (Comparative Example 1) and the carbon felt impregnated with the alumina-silica composite sol binder only (Comparative Example 2).

These results show that the amount of the inorganic particles mixed with the sol binder and impregnated into the carbon felt can be controlled.

When comparing the carbon felts of Example 3 and Comparative Example 2, the carbon wettability and adhesive strength of the composite sol were better than those of the alumina sol. However, when the dispersed alumina slurry was added to the composite sol, phase separation occurred. At this time, the addition of methanol made a slurry for coating heterogeneous. In contrast, when distilled water was used instead of methanol, the concentration of the slurry for impregnation was adjustable. The carbon felt hardly wettable with water was used after surface modification. For the surface modification, the carbon felt was dipped in and taken out of the dilute solution of the ethylene glycol-based surface modifier in methanol.

Experimental Example 1: Scanning Electron Microscopy (SEM) Measurement

The surface structures of the impregnated carbon felts of Examples 1 and 3 and Comparative Example 2 were analyzed by scanning electron microscopy (SEM).

Figure 1A:
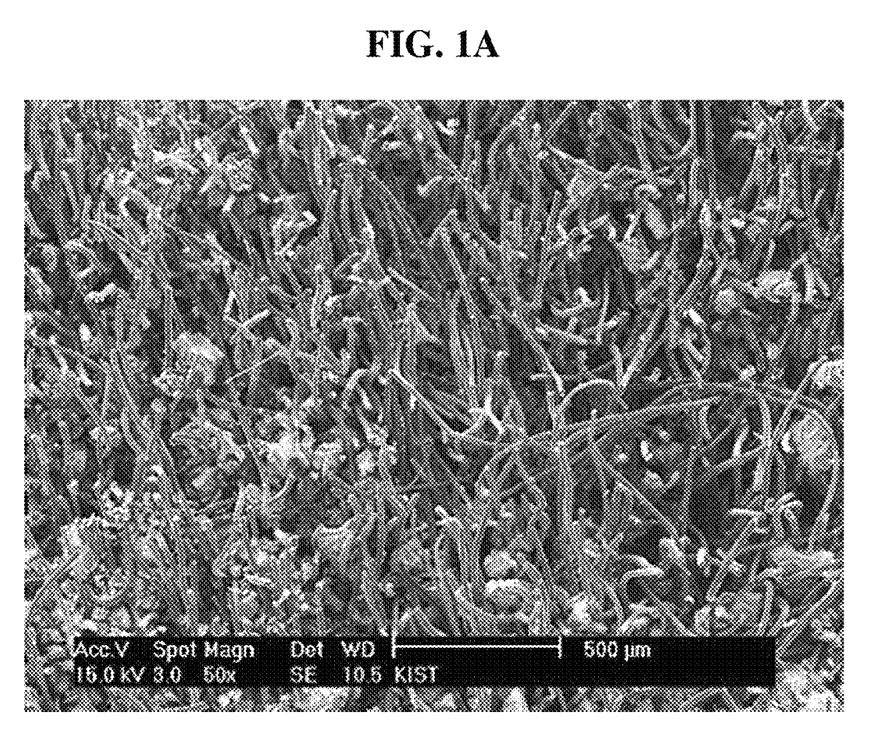
FIG. 1A shows scanning electron microscopy images of a carbon felt impregnated with alumina according to one embodiment of the present invention, which was produced in Example 1, at 50 times magnification.
Figure 1B:
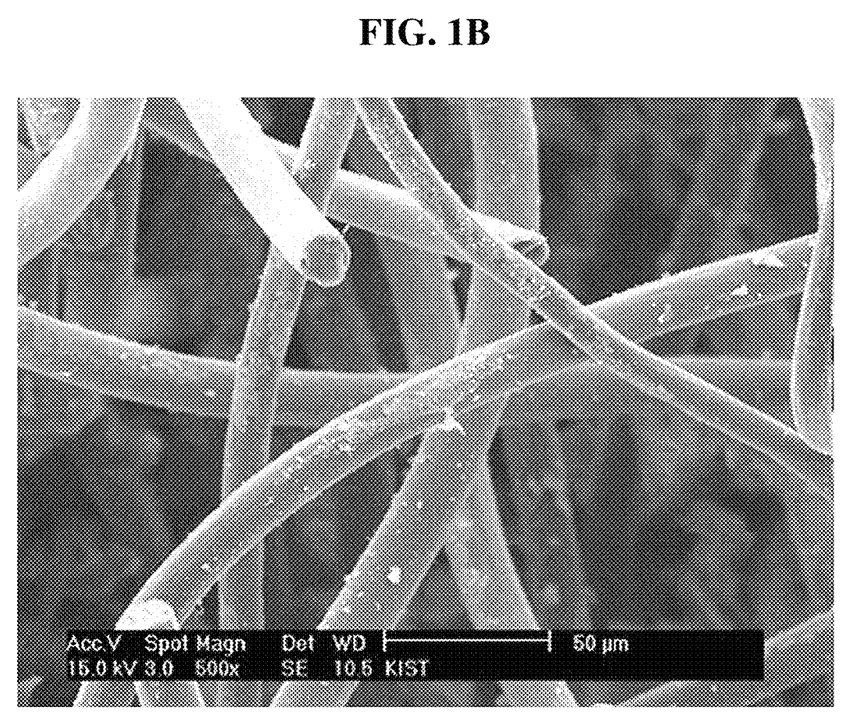
FIG. 1B shows scanning electron microscopy images of a carbon felt impregnated with alumina according to one embodiment of the present invention, which was produced in Example 1, at 500 times magnification.

FIGS. 1A and 1B show the carbon felt impregnated with the alumina powder/alumina sol, which was produced in Example 1. As shown in FIGS. 1A and 1B, the small clusters of the alumina particles had a size of 10-150 μm, the size of the alumina partially coated on the carbon felt was about 0.3 μm corresponding to that of the powder added, and some of the alumina particles aggregated to a size of about 3 μm. However, the alumina aggregated to form small clusters while partially coating the carbon felt.

Figure 2A:
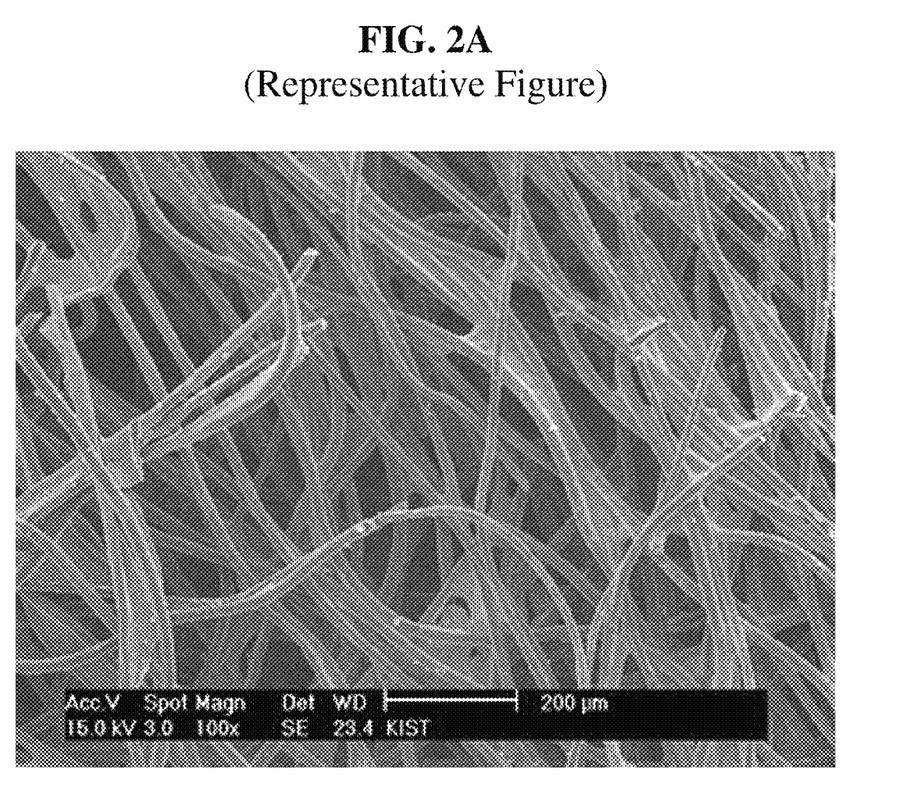
FIG. 2A shows scanning electron microscopy images of a carbon felt impregnated with alumina according to one embodiment of the present invention, which was produced in Example 4, at 100 times magnification.
Figure 2B:
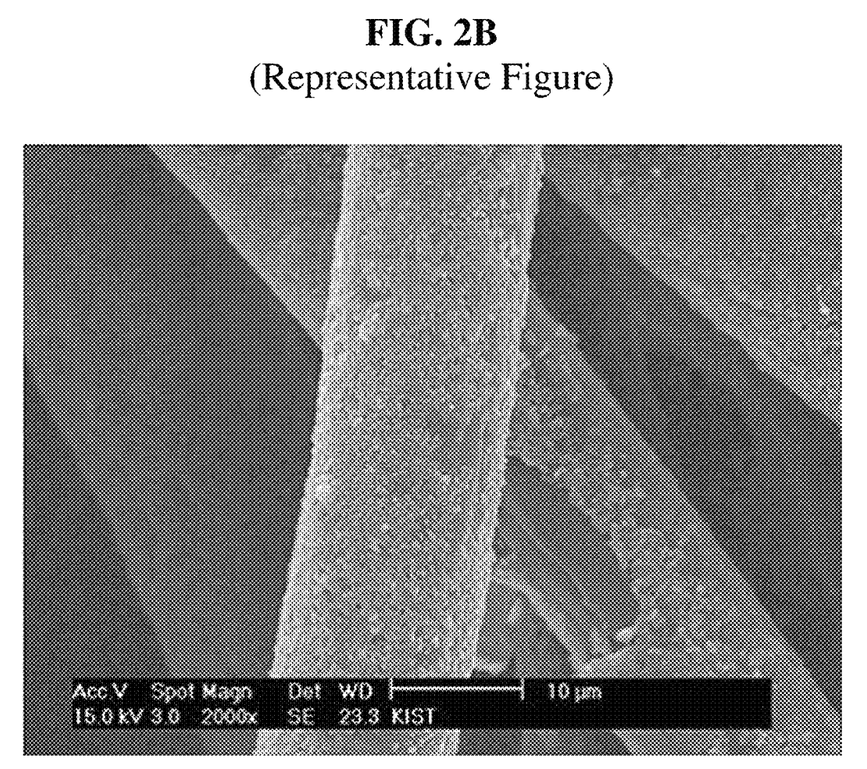
FIG. 2B shows scanning electron microscopy images of a carbon felt impregnated with alumina according to one embodiment of the present invention, which was produced in Example 4, at 2000 times magnification.

FIGS. 2A and 2B show the carbon felt impregnated with the alumina powder/alumina-silica composite sol, which was produced in Example 3. As shown in FIGS. 2A and 2B, the alumina particles were uniformly coated on the carbon fibers. The lower magnification image shows that the alumina particles aggregated at points where the carbon fibers met together.

Figure 3A:
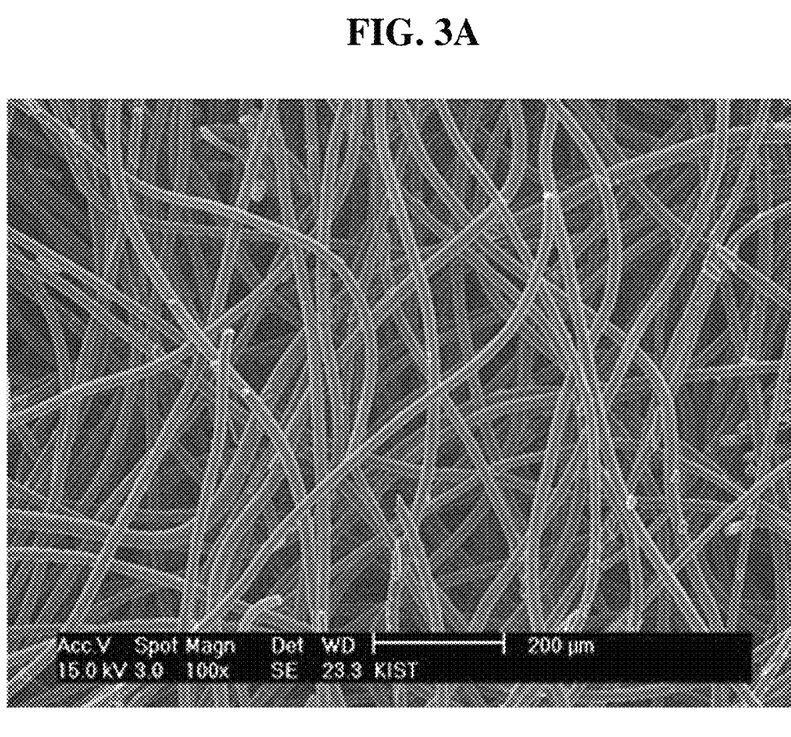
FIG. 3A shows scanning electron microscopy images of a carbon felt coated with alumina-silica according to one embodiment of the present invention, which was produced in Comparative Example 2, at 100 times magnification.
Figure 3B:
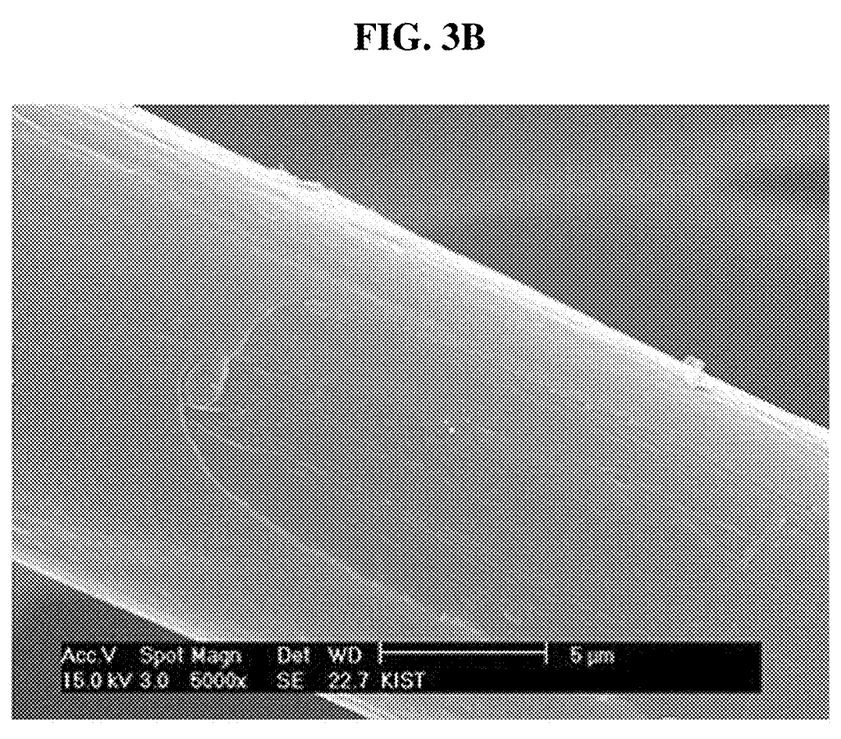
FIG. 3B shows scanning electron microscopy images of a carbon felt coated with alumina-silica according to one embodiment of the present invention, which was produced in Comparative Example 2, at 5000 times magnification.

FIGS. 3A and 3B show the carbon felt using the alumina-silica composite sol binder only, which was produced in Comparative Example 2. As shown in FIGS. 3A and 3B, the carbon felt was uniformly coated with small aggregates of the sol. The higher magnification image of FIG. 3B shows that an about 0.1 μm thick coating was uniformly coated on the carbon fiber.

These results lead to the conclusion that the binder used in the production of the impregnated carbon felt of the present invention enables the formation of a coating with good adhesion to the carbon fibers and is suitable for coating the carbon felt with the inorganic particles. In addition, an appropriate amount of the sol binder capable of attaching the inorganic particles to the carbon felt to form a coating can be empirically determined taking into consideration the finding that the thickness of the coating is dependent on the concentration of the sol binder and the coating tends to be brittle as its thickness increases.

According to the exemplary embodiments of the present invention, the problem of the prior art can be solved in which inorganic particles such as alumina particles are not directly adhered to carbon felts, thus necessitating complicated processes. In addition, a slurry including an inorganic binder and alumina particles can be used to directly and partially coat the alumina particles on the surface of a carbon felt, making the production procedure very simple. Furthermore, the use of the carbon felt surface coated with the alumina particles in a Na—S battery increases the wicking of sodium polysulfides, suppresses the accumulation of sulfur as an insulator on the surface of beta-alumina as an electrolyte, and inhibits non-uniform aggregation of sulfur or sodium polysulfides on the carbon felt, so that the concentration polarization of charges can be reduced without a significant increase in the internal resistance of the battery, achieving high utilization efficiency of sulfur as a reactant.

What is claimed is:

1. A method for producing a carbon felt impregnated with inorganic particles, the method comprising:
   (1) preparing an inorganic-organic hybrid sol binder by peptizing boehmite and mixing the peptized boehmite with 3-glycidoxypropyltrimethoxysilane;
   (2) dispersing the inorganic-organic hybrid sol binder in a solvent and adding inorganic particles to the dispersion to prepare a slurry for impregnation; and
   (3) impregnating a carbon felt into the slurry.

2. The method according to claim 1, wherein the inorganic-organic hybrid sol binder is a translucent alumina-silica composite sol binder.

3. The method according to claim 1, wherein the carbon felt is surface modified with a polyethylene glycol-based surface modifier before impregnation with the slurry in step (3).

4. The method according to claim 1, wherein the inorganic particles used in step (2) have an average diameter of 0.1 to 1 μm.

5. The method according to claim 1, wherein the content of the inorganic-organic hybrid sol binder in the slurry is from 0.5 to 5% by weight and the content of the inorganic particles in the slurry is from 3 to 30% by weight.

6. The method according to claim 1, wherein the inorganic particles used in step (2) are selected from particles of alumina, silica, $TiO_2$, $ZrO_2$, and mixtures thereof.

7. The method according to claim 1, further comprising (3') heat-treatment of the impregnated carbon fibers after step (3) wherein the heat-treatment is performed at a temperature of 100 to 300° C. in air or at a temperature of 300 to 1200° C. in an inert gas, reducing atmosphere or vacuum.

8. The method according to claim 1, further comprising (2') diluting the slurry with an alcohol after step (2), wherein the alcohol is selected from methanol, ethanol, propanol, butanol, cellosolves, and mixtures thereof.

* * * * *